US008565390B2

(12) United States Patent
Liu et al.

(10) Patent No.: US 8,565,390 B2
(45) Date of Patent: *Oct. 22, 2013

(54) DYNAMICALLY RECONFIGURABLE DISTRIBUTED INTERACTIVE VOICE RESPONSE SYSTEM

(75) Inventors: Te-Kai Liu, Elmsford, NY (US); Kiyoshi Maruyama, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,289

(22) Filed: Jun. 14, 2012

(65) Prior Publication Data
US 2012/0250849 A1 Oct. 4, 2012

Related U.S. Application Data

(63) Continuation of application No. 12/102,969, filed on Apr. 15, 2008, now Pat. No. 8,233,593, which is a continuation of application No. 10/917,550, filed on Aug. 12, 2004, now Pat. No. 7,379,539, which is a continuation of application No. 09/239,329, filed on Jan. 28, 1999, now Pat. No. 6,804,333.

(51) Int. Cl.
*H04M 1/64* (2006.01)
(52) U.S. Cl.
USPC ............ 379/88.17; 379/88.22; 379/201.02; 704/270; 709/217
(58) Field of Classification Search
USPC ............ 379/88.17, 88.22, 201.02; 704/270; 709/217
See application file for complete search history.

(56) References Cited

U.S. PATENT DOCUMENTS 5,537,461 A 7/1996 Bridges et al.
5,761,662 A 6/1998 Dasan
(Continued)

FOREIGN PATENT DOCUMENTS

| JP | 7-68480 A | 3/1995 |
| JP | 2001-145639 A | 5/2001 |
| JP | 2003-265500 A | 9/2003 |
| JP | 2004-50356 A | 2/2004 |
| JP | 2007-11978 A | 1/2007 |
| JP | 2010-284781 A | 12/2010 |

OTHER PUBLICATIONS

Phone Browser by Bell Labs. http://www.bell-labs.com/profect/tardis/portal.html; Integrated Web and Telephone Service Creation, Bell Labs Technical Journal, 1997.

*Primary Examiner* — Gerald Gauthier
*Assistant Examiner* — Simon King
(74) *Attorney, Agent, or Firm* — Scully, Scott, Murphy & Presser, P.C.; Eustus D. Nelson, Esq.

(57) ABSTRACT

The present invention relates to managing connections between one or more data network interfaces and one or more phone interfaces. In one embodiment, a manager process, running on a computer system receives one or more telephone calls from one or more users over one of the phone interfaces and then accesses one or more profiles associated with each of the users. These profiles have one or more service identifiers and one or more interactive response agent (IRA) identifiers associated with the respective user. A menu of the service identifiers is presented to the user. The manager process looks up an agent address of one of the IRAs that is associated with the service identifier selected by the user from the menu and establishes a session with the associated IRA. A two-way communication with the associated IRA occurs during the session.

20 Claims, 6 Drawing Sheets

(56) References Cited

U.S. PATENT DOCUMENTS

| | | |
|---|---|---|
| 5,884,262 A | 3/1999 | Wise et al. |
| 5,915,001 A | 6/1999 | Uppaluru |
| 5,923,736 A * | 7/1999 | Shachar .................... 379/93.17 |
| 6,269,336 B1 | 7/2001 | Ladd et al. |
| 6,317,484 B1 * | 11/2001 | McAllister ................. 379/88.02 |
| 6,327,363 B1 | 12/2001 | Henderson et al. |
| 6,353,661 B1 | 3/2002 | Bailey, III |
| 6,564,251 B2 | 5/2003 | Katariya et al. |

* cited by examiner

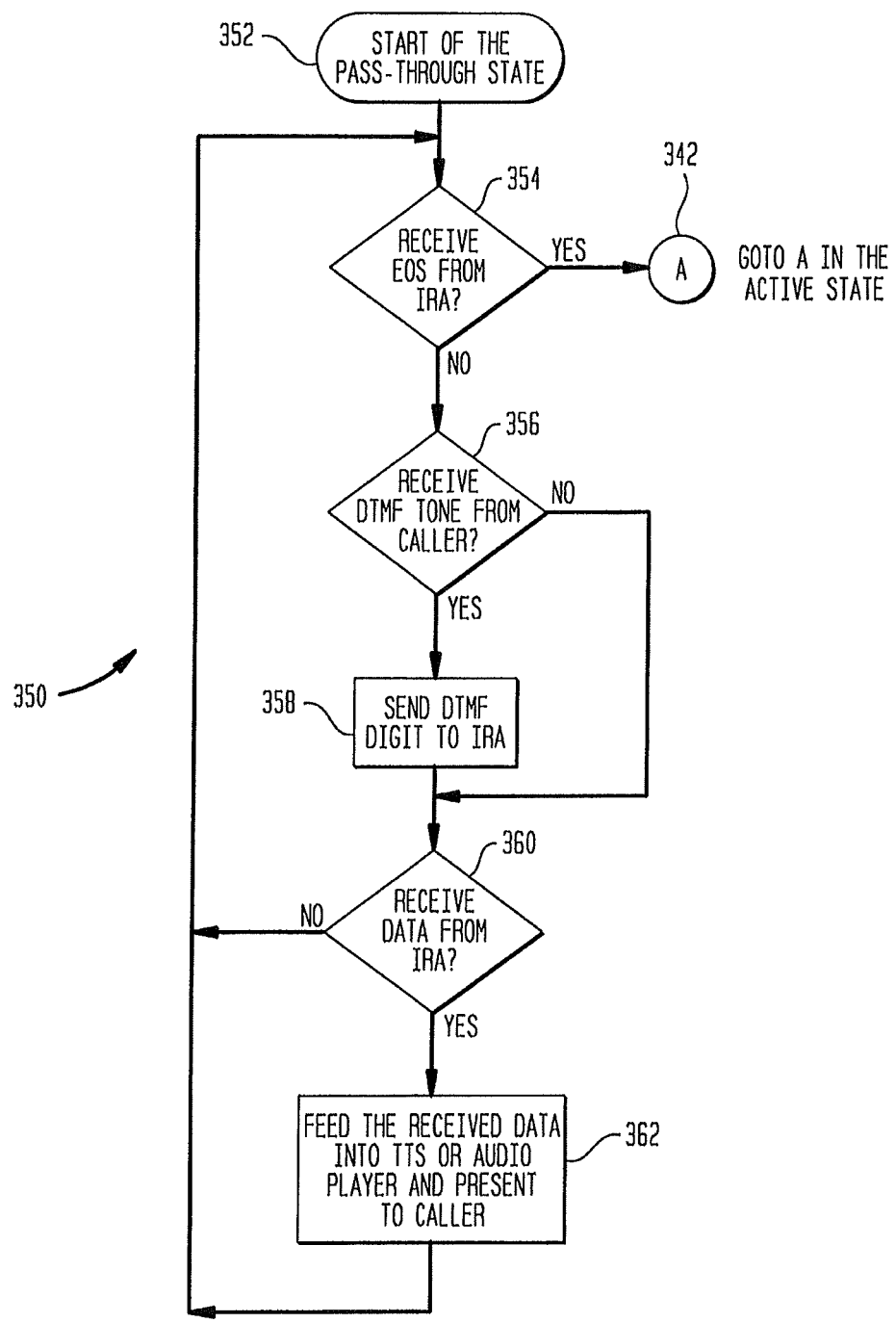

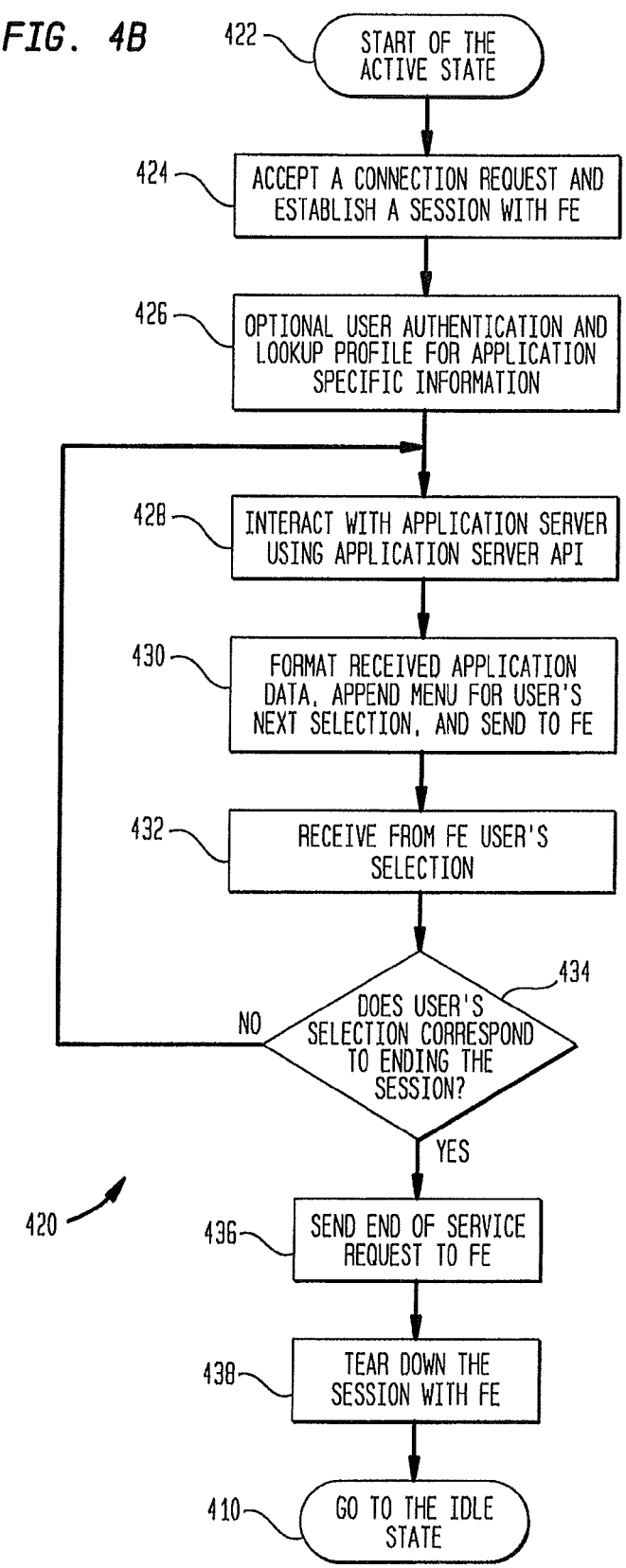

DYNAMICALLY RECONFIGURABLE DISTRIBUTED INTERACTIVE VOICE RESPONSE SYSTEM

CROSS REFERENCE TO RELATED APPLICATIONS

This application is a continuation of co-pending application Ser. No. 12/102,969, filed Apr. 15, 2008, which is a continuation of U.S. patent application Ser. No. 10/917,550, filed Aug. 12, 2004, now U.S. Pat. No. 7,379,539, issued May 27, 2008, which is a continuation of U.S. patent application Ser. No. 09/239,329, filed Jan. 28, 1999, now U.S. Pat. No. 6,804,333, issued Oct. 12, 2004.

FIELD OF THE INVENTION

The present invention generally relates to telephone-based information access systems, and more particularly to a distributed architecture for telephone users to access information and service from their Internet service providers.

BACKGROUND OF THE INVENTION

Many businesses use interactive voice response (TVR) systems to automatically respond to customer inquiries. For example, a customer can make a phone call to the IVR system of a business and establish a connection via a public switched telephone network or a cellular phone network. Once the connection is made, the customer can interact with the IVR system to access desired information such as account balance or to conduct transactions such as transfer between accounts. The caller typically responds to the voice menus of the IVR system by pressing the keypad on his telephone set. Very often such phone calls are made using the toll-free number associated with the business and the cost of the call is paid by the business.

There exist other TVR systems which allow the employees of a corporation to access their e-mail by making a phone call to the corporation's TVR system which interfaces with the e-mail server. For example, Phonesoft Inc. has a IVR product that interfaces with Lotus e-mail servers. The corporation has to pay the cost of the calls which may be long distance when their employees travel.

U.S. Pat. No. 5,537,461, "Information Services Platform", has recognized that the cost of such phone calls can be greatly reduced by connecting such a call to an information services platform associated with the point the call enters the telephone network so that an inquiry entered by the calling party may be received by a front end of the platform which then passes the inquiry to a back end of the platform for presentation to a called source of information. (This patent is herein incorporated by reference in its entirety.) The advantage is that the v connection to a conventional IVR system via a telephone network is replaced by an inexpensive data network. But the front end of the information services platform in this patent is not generic. This means that some service specific programs or scripts have to be pre-installed at the front end.

"Phone Browser" from Bell Labs is another system which has the concept of a separate front end and back end. The phone browser together with the front end acts as a Web browser but with no visual information presented to the caller. However, Web servers are the only information source that the caller can access by the phone browser system.

FIG. 1 shows a system diagram of a typical prior art phone browser system 100. The system allows a telephone user to access the Web pages (not shown) residing at Web servers 170 on the Internet. The system works as follows. A caller picks up a phone 105 and dials the phone amber corresponding to the URL (Universal Resource Locator) of the Web page that he/she wants to reach. The phone call will be routed by the PSTN (public switch telephone network) 110 to a TVR platform 120 which on one hand interfaces with the PSTN 110 and on the other hand interfaces with the Internet 150, to which a phone browser 160 and a Web server 170 are connected. The phone call will be picked up at the IVR platform 120 by the call handling routine 122 which will find the destined URL, by looking up the phone number/URL table 124 based on the phone number the caller dialed. The call handling routine 122 then proceeds to establish a session with a phone browser 160 and initializes the phone browser 160 with the selected URL by a proprietary protocol, called V protocol. The phone browser 160 then interacts with the Web server 170 hosting the destined URL by the Hyper-Text Transport Protocol (HTTP).

The IVR platform 120 interfaces with the PSTN via a telephony interface 128 which includes DTMF (Dual-Tone Multi-Frequency) detection, call answering/disconnecting, digital-to-analog and analog-to-digital converters, etc. The IVR platform 120 includes audio functions 126 such as text-to-speech converters, audio players, audio recorders, etc. The information (e.g. text and audio) obtained from the Web server 170 is first processed by the phone browser 160 (e.g., appending a voice menu at the end of the page.) The processed information is then sent to the call handling routine 122 via V protocol. The received information at the call handling routine 122 is presented to the caller after the necessary conversion is done at the IVR platform 120. The caller now listens to the transformed Web page in speech and chooses the next URL by pressing the corresponding touch-tone button on the phone 105 according to the voice menu presented to the caller by the call handing routine 122. The call handling routine 122 converts the received DTMF tone into a digital format (e.g., ASCII text) and sends it to the phone browser for specifying the next Web page. The process repeats till the caller hangs up the phone. If the caller should want to access another service (Web site) hosting by another Web server 170, the caller has to disconnect the call and dial the phone number corresponding to the URL that he/she wants to reach. The aforementioned phone browser system is a service-oriented distributed IVR system, i.e., one service per phone number.

PROBLEMS WITH THE PRIOR ART

Most systems in the prior art have many restrictions and limitations. First, the conventional IVR systems are in general expensive, and the buyers have to maintain the systems in order to make sure that the capacity scales up as traffic increases. In addition, the cost of long distance phone calls will accumulate and may become a major expense for the owners of the IVR systems.

Second, the information service platform described in U.S. Pat. No. 5,537,461 is primarily a solution for telephone carriers. The providers of the information source need to work with their carrier to pre-install service-specific programs or scripts at the front ends. Furthermore, every time the service is changed, the information service provider has to rely on its carrier to upgrade the front end program. This requirement limits the usage of the information services platform.

Third, the phone browser approach is limited to Web content. There exist many other types of information sources such as non-Internet based e-mil and database servers which cannot be accessed by a phone browser.

Fourth, all the aforementioned IVR architectures are service-oriented, which means that each phone number is associated with a particular service offered by a service provider. Separate phone calls have to be made if the caller wants to access multiple services by different service providers.

OBJECTS OF THE INVENTION

An object of this invention is an improved system and method that allows users to use telephones (without computers and modems) to call their ISPs (Internet service providers) and access the information and service they need from one or more digital networks.

An object of this invention is an improved system and method that frees the customers of an ISP from the burden of high IVR cost and scalability by letting the ISP operate—the telephony/speech functions at the point-of-presence (POP), i.e., the place users call in.

An object of this invention is to provide a system and method for a caller to access multiple application servers (i.e., multiple services) by just one phone call.

SUMMARY OF THE INVENTION

The present invention is a computer system and method that manages connections between one or more data network interfaces and one or more phone interfaces. A manager process, running on a computer system having both data and phone network interfaces, receives one or more telephone calls from one or more users over one of the phone interfaces and than accesses one or more profiles associated with each of the users. These profiles have one or more service identifiers and one or more interactive response agent (IRA) identifiers associated with the respective user. A menu of the service identifiers is presented to the user. The system then looks up an agent address of one of the IRAs that is associated with the service identifier selected by the user from the menu and establishes a session with the associated IRA. Having done this a two-way communication with the associated IR occurs during the session. In this communication, the IRA is capable of passing information to the system from one or more application servers to which the IRA is connected over one or more data networks.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 3C is a flowchart describing the front end manager in the pass-through state.

FIG. 4B is a flowchart for describing the IRA manager in the active state.

DETAILED DESCRIPTION OF THE INVENTION

Because of the intensive competition in the market, every Internet service provider (ISP) is looking for opportunities to enhance its service offerings to stay competitive. This invention discloses a service architecture that allows an ISP to deploy enhanced information services for its customers without incurring high deployment cost.

In this invention, the functions of an IVR system are split into two parts, i.e., a front end and a back end. The front end is populated at the POPS of an ISP and the back end is located at anywhere in the Internet. Particularly, the invention lets an ISP provide the functions of telephony (e.g., call handling and touch-tone detection) and audio (e.g., playing audio files, voice recording, and text-to-speech conversion) at every POP, and puts the software components (which interact with users) in the Internet.

A software component, called an interactive response agent (IRA) located in the Internet interacts with users. An IRA has two roles: one is to interact with users who are using touch-tone phones, and the other is to interface with application servers such as e-mail servers, voicemail servers, Web servers, database servers etc. on user's behalf. If the information retrieved by an IRA is in text format, it will be sent to the POP where the user called in, converted into synthesized speech by text-to-speech converters, and played back to users over telephone lines. If the retrieved information is an audio file, as in a phonemail system, the information will be sent to the POP, converted into a form for playing back over a phone line.

The present invention not only telephone-enables application servers, it also provides a two-fold advantage to an ISP's corporate customers. On one hand, the corporate customers of an ISP can easily enable their end users to access corporate information without buying expensive IVR units. On the other hand, corporations can have full control of IRAs which retrieve corporate information on behalf of end users. What a corporate customer needs is an IRA that interfaces with the ISP's POP. In general, different application servers are accessed by different protocols, e.g., HTTP for Web servers.) The application-dependent IRA can be provided by an ISP, purchased from third party vendors, or developed by corporate I/S staff. For popular information servers, such as Lotus Notes e-mail servers, Microsoft Exchange servers, and Web servers, third party vendors can help to develop the corresponding IRA components. For corporate proprietary database applications, the corporate has to develop its own IRA which interfaces with ISP's POP. In order to make the components developed by various vendors interoperable, a set of API (application programming interface) between POPs and IRAs can be standardized.

Figure 1:
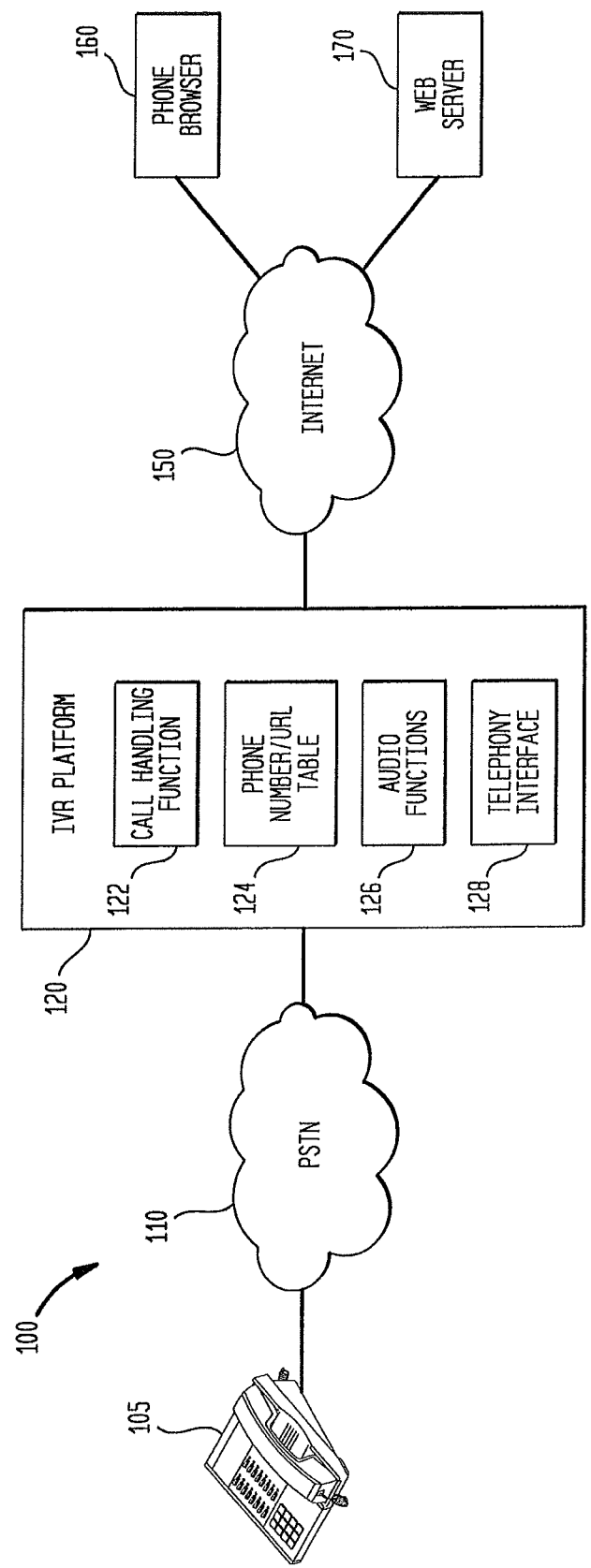
FIG. 1 is a system diagram of a prior art phone browser system.
Figure 2:
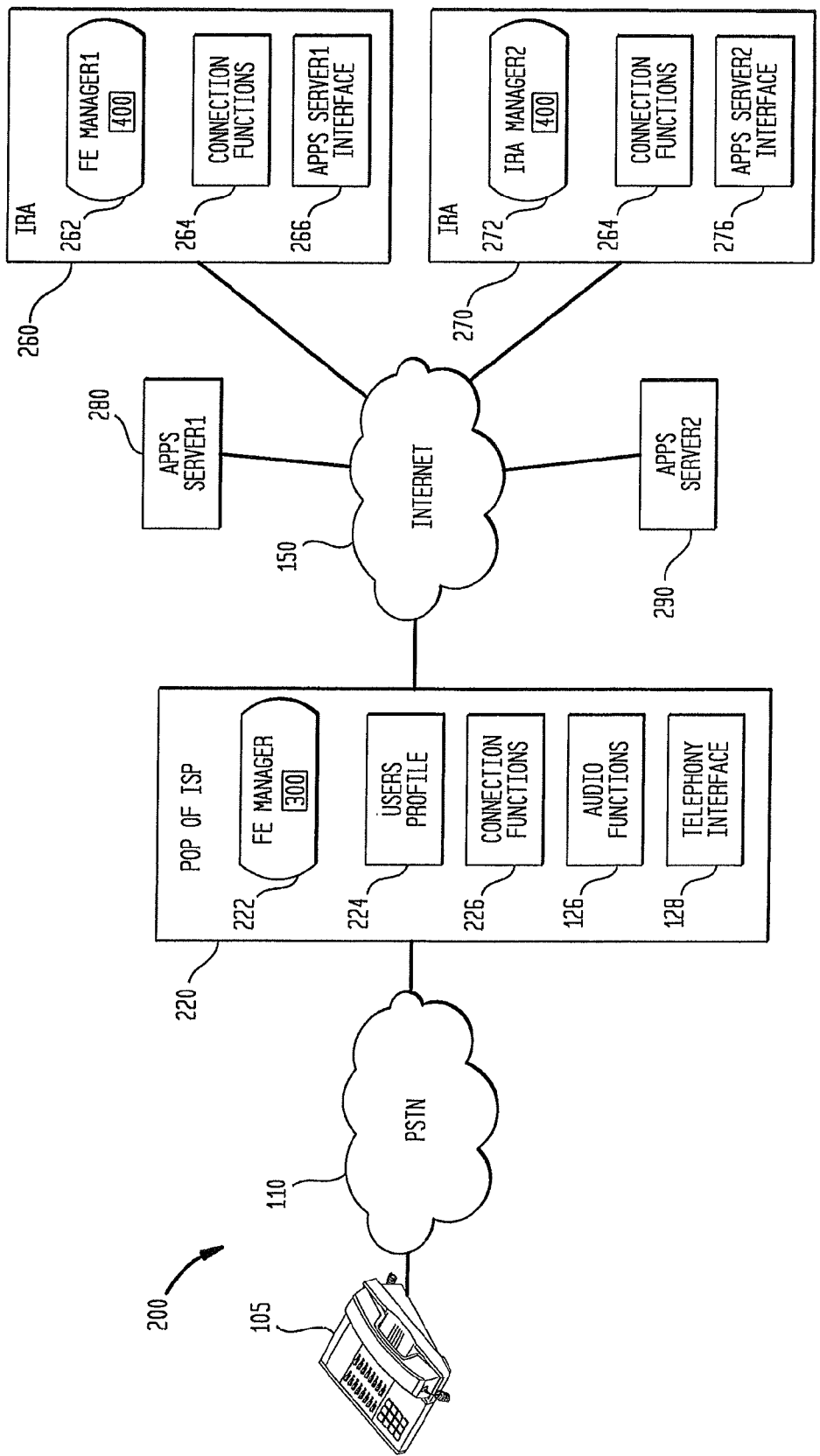
FIG. 2 is a system diagram of the present invention.

FIG. 2 shows a system diagram for the present invention which takes a user-oriented approach to distributed IVR systems. In FIG. 2, like reference numerals represent the same component as in FIG. 1.

FIG. 2 shows a telephone 105 connected to a PSTN 110 which connects to a local point-of-presence (POP) 220 of an Internet service provider (ISP). The POP 220 includes a front end (FE) manager 222 which is a call handling routine, users profile 224, connection functions 226, audio functions 126, and a telephony interface 128 for interfacing with the PSTN 110. The behavior of the FE manager 222 is controlled by a state machine 300 shown in FIG. 3A.

One major component in the present invention is the users profile 224 which contains, among other things, authentication passwords and billing information, a table describing the service item that the user has subscribed to and the network addresses of the interactive response agents providing those services for each subscriber of the ISP. When a subscriber of the ISP called a local POP 220, the phone call will be answered by a front end (FE) manager 222. After the caller is authenticated the caller will be able to specify the desired service item, and the FE manager 222 will establish a session and communicate with the corresponding IRA through connection functions 226 over the Internet 150. In the present invention, each subscriber is able to maintain his/her profile and add/delete a pair of a service item and the corresponding network address of the IRA handling that service. Moreover, when the caller is done with a service, the session between the FE manager 222 and the IRA manager 262 will be terminated and the caller will have an opportunity to select another service item in his/her profile. Hence the front end at a POP is not statically tied with a particular IRA during a phone call, i.e., a dynamically reconfigurable capability. The detailed algorithms of a FE manager and an IRA manager to achieve this capability are described in FIGS. 3A-3C and 4A-4B.

The connection functions 226 are a set of API for the FE manager 222 to establish a session and have a two-way communication with IRA managers, e.g., IRA manager 262 and 272. The connection functions 226 include API calls to send a session request, send DTMF a digit, send an audio file, receive a text message, receive an audio file, and terminate a session.

The FE manager 222 is further interfaced with the Internet 150 to which IRA 260, IRA 270, application server 280 and application server 290 are connected. The IRA 260 and 270 are agents working between the FE manager and back end application servers such as e-mail servers, financial database servers, Web servers, etc. An IRA gives the caller the feeling of interacting with an IVR system. An IRA can be specialized in interfacing with a specific type of servers. An IRA can also implement multiple server interfaces for communicating with different types of application servers. For example, application server 280 can be a Lotus Notes server; IRA 270 has the API to communicate with it. Application 290 can be a computer running Web server, POP3 email server and news server; IRA 270 has the set of APIs to communicate with multiple application servers. In a preferred embodiment, this IRA 270 has a security profile as described in U.S. patent application Ser. No. 09/239,322, now U.S. Pat. No. 6,484,263 issued Nov. 19, 2002 to Liu entitled "Security Profile for Web Browser," filed Jan. 28, 1999 and is herein incorporated by reference in its entirety. In FIG. 2, IRA 260 contains an IRA manager 262, connection functions 264, and server interface 266 for interfacing with server 280. The behavior of the IRA manager 262 is controlled by a state machine 400, to be detailed in FIG. 4A. The FE manager 222 interacts with the IRA manager 262 by a set of API as defined in connection functions 226 and 264 over the Internet 150. The connection functions 264 are a set of API calls for the IRA manager 262 to establish a session and have a two-way communication with FE manager 222. The connection functions 264 include API calls to accept a session request, receive a DTMF digit, receive an audio file, send a text message, send an audio file, and send end-of-service request.

Figure 3A:
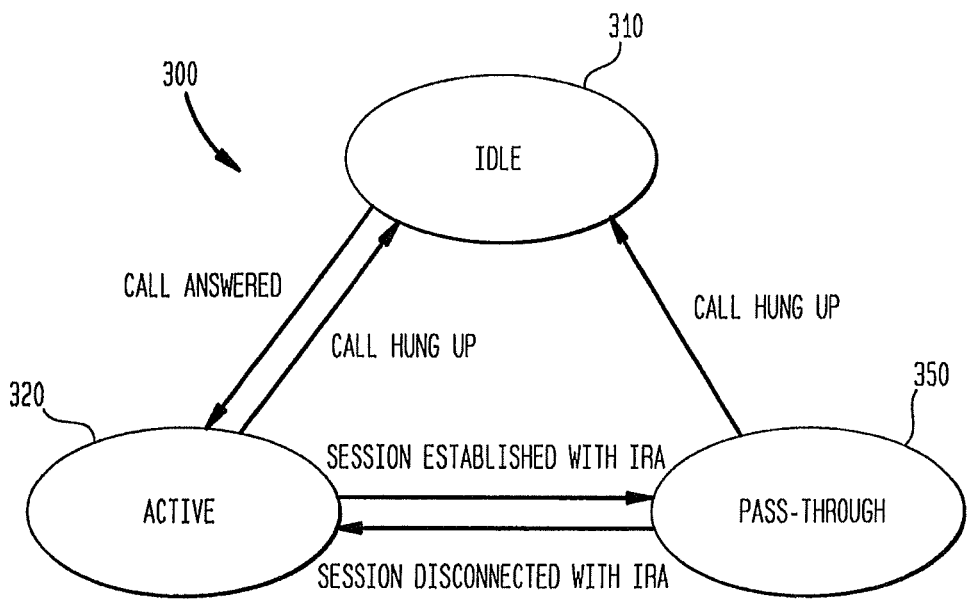
FIG. 3A is a state transition diagram of a front end manager.

FIG. 3A is the state transition diagram 300 of the FE manager 222. The FE manager 222 has 3 possible states, namely the idle state 310, the active state 320, and the pass-through state 350. Initially the FE manager stays in the idle state 310. When a new phone call is answered, the FE manager 222 moves to the active state 320 which is detailed by the flowchart in FIG. 3B. The FE manager 222 stays in the active state until either the phone call is hung up, at which point the FE manager goes back to the idle state 310, or until a session is established with an IRA, at which point the FE manager 222 moves to the pass-through state 350, detailed in FIG. 3C. The FE manager 222 stays in the pass-through state until either the phone call is hung up, at which point it goes to the idle state 310, or until the session with the IRA is terminated, at which point it goes back to the active state 320. A session between the FE manager 222 and the IRA manager 262 is established after the IRA manager 262 sends the FE manager 222 an acknowledgment in response to a request sent by the FE manager 222. The session is terminated when the IRA manager 262 sends an end-of-service request to the FE manager 222.

Figure 3B:
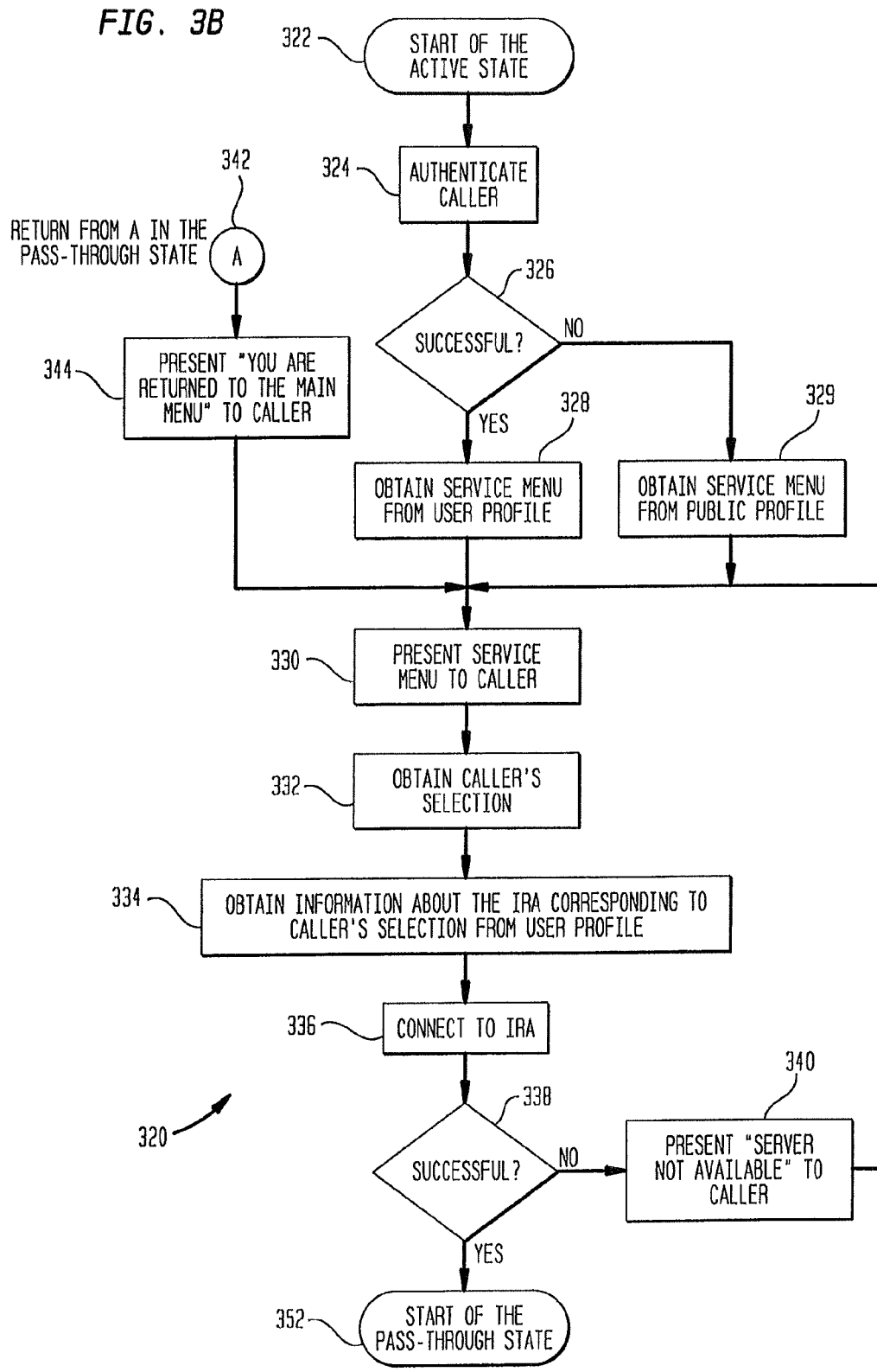
FIG. 3B is a flowchart describing the front end manager in the active state.

FIG. 3B shows a flowchart describing the FE manager 222 in the active state 320. The FE manager 222, starting at step 322 and authenticate the caller in step 324, where the caller is prompted to supply the user ID and personal identification number by pressing touch-tone pads on the phone. The user ID and PIN are checked against the user's profile 224 in step 326. If authentication is successful, the FE manager 222 will in step 328 obtain a service menu from the user's profile stored in users profile 224. If the authentication is not successful, the FE manager 222 will in step 329 obtain a service menu from the public profile stored in users profile 224. The obtained service menu is then presented to the caller in step 330. The FE manager 222 then obtains the service item chosen by the caller in step 332, and finds the network address of the IRA corresponding to the caller's selection in step 334. The FE manager 222 then tries to establish a session with the IRA in step 336 and checks the successfulness in step 338. If the session is successfully established, the FE manager 222 transits to the pass-through state 350 and enters step 352 (see FIG. 3C.) If the session is not successfully established, FE manager 222 will report to the caller in step 340 that the chosen IRA is not available, and go back to step 330. It is possible that the FE manager 222 enters the active state 320 from the pass-through state 350 in step 342. In such a case, the FE manager 222 will in step 344 inform the caller that he/she is back to the main service menu at the front end and go to step 330.

FIG. 3C shows a flowchart for the FE manager 222 in the pass-through state 350 where a session is already established with an IRA. The FE manager 222 starts at step 352 and checks if it receives an end-of-service (EOS) request from the IRA in step 354. If EOS is received, the FE manager 222 will disconnect the session with the IRA and goes to step 342, an entry point to the flowchart of the active state in FIG. 38. If no EOS is received, the FE manager 222 will check if the telephony interface 128 receives DTMF tones from the caller in step 356. If any DTMF tone is received, the FE manager 222 will send the DTMF digit, converted from tones by the telephony interface 128, to the IRA in step 358. Then the FE manager 222 will check if any data (text or audio) is received from the IRA in step 360. If there is data received from the IRA, the FE manager 222 will invoke the appropriate converters, such as text-to-speech converters and audio players, and present the information to the caller through the telephony interface 128 in step 362.

If no data is received from the IRA in step 360, the FE manager 222 will go back to step 354.

Figure 4A:
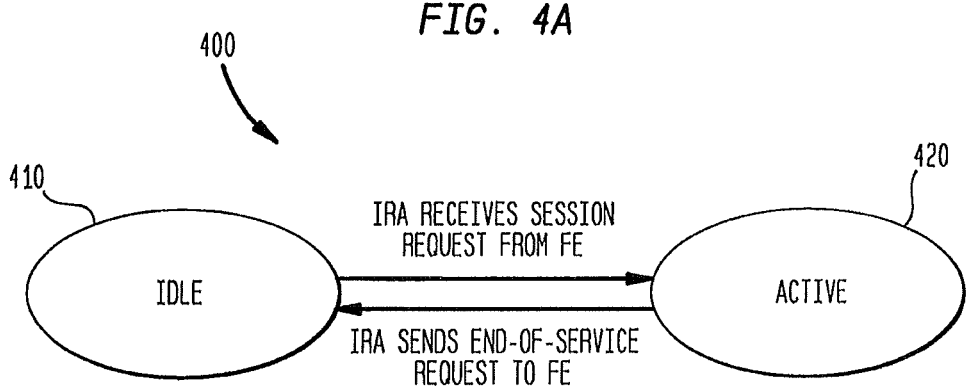
FIG. 4A is a state transition diagram for an IRA manager.

FIG. 4A is a state transition diagram 400 for an IRA manager 262. An IRA manager 262 has 2 possible states, namely the idle state 410 and the active state 420. Initially IRA manager 262 stays in the idle state 410 until it receives a request to establish a session from a FE manager, at which point it establishes a session with the requesting FE manager by sending back an acknowledgment and goes to the active state 420, detailed in FIG. 4b. IRA manager 262 will stay in the active state 420 until the caller wants to end the session, at which point the IRA manager 262 will send end-of-service (EOS) request to the FE manager 222, terminate the session, and go back to the idle state 410.

FIG. 4B shows a flowchart describing the IRA manager 262 in the active state 420. The IRA manager 262 starts at step 422 and establishes a session with the requesting FE manager 222 using connection functions 264 in step 424. Depending on whether the underlined service is public or personal, the IRA manager 262 may authenticate the user in step 426 by prompting the user to supply user's account number and password. For example, e-mail is a personal service. The IRA manager 262 then enters a loop where it interacts with an application server such as the application server 280 to obtain the data that the user needs in step 428 using the application server interface 266. The IRA manager 262 then formats received application data, appends service menu for user's next selection, and sends data to the FE manager 222 in step 430. The IRA manager 262 receives user's selection from the FE manager 222 in step 432 and checks if the user's selection correspond to ending the service in step 434. If the user's selection is not to end the service, the IRA manager 262 goes back to step 428 to obtain application data. The IRA manager 262 exits the loop at step 434 when it finds that the user selects to end the session. In such a case, the IRA manager 262 sends an end-of-service (EOS) request to the FE manager 222 in step 436, tears down the session at step 438, and proceeds to the idle state at step 410.

The present invention discloses a service architecture for ISPs to offer phone-enabled information services such as e-mail, stock quotes, weather information, travel information, personalized traffic information, personalized news services, financial services, sports information, professional services, ticket information, on-line shopping, etc. These many types of services can be provided by different IRAs supported by different vendors as long as users put the network addresses of the IRAs they have access to into their user profiles. Simply by a local phone call to his local ISP, the dynamically reconfigurable capability of the distributed IVR systems disclosed by this invention will allow a caller to visit multiple service providers' IRAs in the same phone call. Callers do not have to memorize multiple phone numbers, one for each service provider.

What is claimed is:

1. A method of managing a request from a user for information from a plurality of web sites, the method comprising:
   a front end manager, in response to receiving a request from a user for information from one or more web sites, accessing a user profile to obtain Internet addresses for a plurality of interactive response agents, and sending a respective start request, over the internet, to each of the interactive response agents to establish a respective session with said each of the interactive response agents;
   each of the interactive response agents, in response to receiving the start request sent to the interactive response agent, establishing the session and sending to the front end manager an acknowledgment of the start request;
   each of the interactive response agents, during the session established by said each of the interactive response agents entering a loop, including said each of the interactive response agents receiving an information request across the Internet from the user for information from a specified one of the plurality of web sites, obtaining information from the specified web site, sending the obtained information across the internet to the user, and monitoring for an end of session signal across the Internet;
   said each of the interactive response agents receiving across the internet a request to end the session; and
   in response to receiving said request to end the session, said each of the interactive response agents ending the session; and wherein:
   the user and the front end manager are on a first side of the Internet; and
   the plurality of interactive response agents are on a second side of the internet, said second side being opposite said first side.

2. The method according to claim 1, wherein said each of the interactive response agents receiving the request for information includes interactive response agent receiving the request for information from the user via the front end manager.

3. The method according to claim 1, wherein said each of the interactive response agents sending an acknowledgement to establish the session includes said each of the interactive response agents sending said acknowledgement to the front end manager.

4. The method according to claim 1, wherein said each of the interactive response agents sending the obtained information to the user includes the step of said each of the interactive response agents sending the obtained information to the user via the front end manager.

5. The method according to claim 1, wherein:
   said each of the interactive response agents has idle and active states;
   the method further comprises said each of the interactive response agents in response to receiving the start request, switching from the idle state to the active state; and
   said each of the interactive response agents, in response to receiving the end request, switching from the active state to the idle state.

6. The method according to claim 1, wherein:
   the front end manager has idle, active and pass-through states; and
   the method further comprises the front end manager, in response to receiving a request from a user for information from one or more Web sites, switching from the idle state to the active state.

7. The method according to claim 6, wherein when one of the sessions is established with one of the interactive response agents, the front end manager switches from the active state to the pass-through state.

8. The method according to claim 7, wherein when all of the sessions with all of the interactive response agents are terminated, the front end manager switches from the pass-through state to the idle state.

9. A front end manager for interfacing between a user and a plurality of web sites, the front end manager being configured for:
   receiving a request from a user for information from one or more web sites;
   in response to receiving said request, accessing a user profile to obtain Internet addresses for a plurality of interactive response agents, and sending a respective start request, over the Internet, to each of the interactive response agents to establish a respective session with said each of the interactive response agents; wherein
   each of the interactive response agents, in response to receiving the start request sent to the interactive response agent, establishes the session, sends to the front end manager an acknowledgment of the start request;
   each of the interactive response agents, during the session established by said each of the interactive response agents receives an information request across the Internet from the user for information from one of the plurality of Web sites specified by the user, obtains information from the specified Web site, and sends the obtained information across the Interface to the user;

the front end manager being further configured for sending to said each of the interactive response agents receiving across the Internet a request to end the session; and wherein:

in response to receiving said end request, said each of the interactive response agents ends the session;

the user and the front end manager are on a first side of the Internet;

the plurality of interactive response agents are on a second side of the Internet, said second side being opposite said first side.

10. The front end manager according to claim 9, wherein the front end manager is further configured for sending the request for information from the user to each of the interactive response agents.

11. The front end manager according to claim 9, wherein the front end manager is further configured for receiving from said each of the interactive response agents an acknowledgement to establish the session.

12. The front end manager according to claim 9, wherein the front end manager is further configured for receiving the obtained information from said each of the interactive response agents and sending the obtained information to the user.

13. The front end manager according to claim 9, wherein:

the front end manager has idle, active and pass-through states; and the front end manager, in response to receiving a request from a user for information from one or more web sites, switches from the idle state to the active state.

14. The front end manager according to claim 13, wherein when one of the sessions is established with one of the interactive response agents, the front end manager switches from the active state to the pass-through state.

15. The front end manager according to claim 14, wherein when all of the sessions with all of the interactive response agents are terminated, the front end manager switches from the pass-through state to the idle state.

16. An article of manufacture comprising:

at least one tangible computer readable device having computer readable program code logic tangibly embodied therein to manage a request from a user for information from a plurality of Web sites, the computer readable program code logic, when executing, performing the following:

using a front end manager, in response to receiving a request from a user for information from one or more web sites, for accessing a user profile to obtain Internet addresses for a plurality of interactive response agents, and for sending a respective start request, over the Internet, to each of the interactive response agents to establish a respective session with said each of the interactive response agents;

using each of the interactive response agents, in response to receiving the start request sent to the interactive response agent, for establishing the session and sending to the front end manager an acknowledgment of the start request;

using each of the interactive response agents, during the session established by said each of the interactive response agents for receiving an information request across the Internet from the user for information from a specified one of the plurality of web sites, obtaining information from the specified web site, sending the obtained information across the Internet to the user, and monitoring for an end of session signal across the Internet;

using said each of the interactive response agents for receiving across the internet a request to end the session; and in response to receiving said request to end the session, said each of the interactive response agents ending the session; and wherein:

the user and the front end manager are on a first side of the internet;

the plurality of interactive response agents are on a second side of the Internet, said second side being opposite said first side.

17. The article of manufacture according to claim 16, wherein said each of the interactive response agents receiving the request for information includes interactive response agents receiving the request for information from the user via the front end manager.

18. The article of manufacture according to claim 16, wherein said each of the interactive response agents sending an acknowledgement to establish the session includes said each of the interactive response agents sending said acknowledgement to the front end manager.

19. The article of manufacture according to claim 16, wherein said each of the interactive response agents sending the obtained information to the user includes the step of said each of the interactive response agents sending the obtained information to the user via the front end manager.

20. The article of manufacture method according to claim 16, wherein:

said each of the interactive response agents has idle and active states;

said each of the interactive response agents in response to receiving the start request, switching from the idle state to the active state; and said each of the interactive response agents, in response to receiving the end request, switching from the active state to the idle state.

* * * * *